United States Patent
Wu et al.

(10) Patent No.: US 9,609,311 B2
(45) Date of Patent: Mar. 28, 2017

(54) STEREOSCOPIC DISPLAY SYSTEM AND IMAGE DISPLAY METHOD THEREOF

(75) Inventors: Chang-Shuo Wu, New Taipei (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1408 days.

(21) Appl. No.: 13/426,564

(22) Filed: Mar. 21, 2012

(65) Prior Publication Data

US 2013/0169622 A1    Jul. 4, 2013

(30) Foreign Application Priority Data

Dec. 29, 2011   (TW) ............................. 100149619 A

(51) Int. Cl.
| | | |
|---|---|---|
| *H04N 13/04* | (2006.01) | |
| *G02B 27/22* | (2006.01) | |
| *G03B 35/24* | (2006.01) | |

(52) U.S. Cl.
CPC ..... *H04N 13/0404* (2013.01); *G02B 27/2214* (2013.01); *G03B 35/24* (2013.01); *H04N 13/0409* (2013.01)

(58) Field of Classification Search
CPC ................ G02B 27/2214; G03B 35/24; H04N 13/0404; H04N 13/0409
See application file for complete search history.

(56) References Cited

U.S. PATENT DOCUMENTS 5,258,833 A * 11/1993 Schenk ............. H04N 13/0404
348/51
6,760,020 B1 * 7/2004 Uchiyama ............... G06T 15/00
345/419
7,116,477 B2   10/2006 Nishihara et al.
7,281,802 B2   10/2007 Saishu et al.
7,420,637 B2   9/2008 Imai et al.
7,506,984 B2   3/2009 Saishu et al.
(Continued)

FOREIGN PATENT DOCUMENTS

| CN | 1655012 | 8/2005 |
|---|---|---|
| CN | 1896865 | 1/2007 |

(Continued)

OTHER PUBLICATIONS

Park et al., "Recent progress in three-dimensional information processing based on integral imaging," Applied Optics, Dec. 1, 2009, pp. H77-H94.

(Continued)

*Primary Examiner* — Nhon Diep
(74) *Attorney, Agent, or Firm* — Jianq Chyun IP Office

(57) ABSTRACT

A stereoscopic display system including a display apparatus and an image guiding plate is provided. The display apparatus provides diverge images. The display apparatus includes a plurality of stereoscopic display unit groups. Each of the stereoscopic display unit groups includes at least one stereoscopic display unit. Each of the stereoscopic display units includes a plurality of pixel groups. In each of the stereoscopic display units, the pixel groups provide a plurality of image beams corresponding to parts of the diverge images. Different stereoscopic display units correspond to different parts of the diverge images. The image guiding plate is disposed on a transmission path of the image beams. The image guiding plate includes a plurality of optical structures arranged periodically, so as to respectively guide the image beams to a plurality of directions. Furthermore, an image display method of the foregoing stereoscopic display system is provided.

24 Claims, 15 Drawing Sheets

(56) References Cited

U.S. PATENT DOCUMENTS

| | | |
|---|---|---|
| 7,619,815 B2 | 11/2009 | Nam et al. |
| 7,633,528 B2 | 12/2009 | Fukushima et al. |
| 7,714,857 B2 | 5/2010 | Fukushima et al. |
| 7,726,816 B2 | 6/2010 | Saishu et al. |
| 7,736,005 B2 | 6/2010 | Saishu et al. |
| 8,446,355 B2 * | 5/2013 | Uehara .............. G02B 27/2214 345/100 |
| 2003/0161040 A1 | 8/2003 | Ishii et al. |
| 2004/0056824 A1 * | 3/2004 | Sudo .................. G02B 27/2264 345/7 |
| 2011/0032339 A1 | 2/2011 | Hirayama et al. |

FOREIGN PATENT DOCUMENTS

| | | |
|---|---|---|
| CN | 101300519 | 11/2008 |
| JP | 2008-015395 | 1/2008 |
| TW | 200933195 | 8/2009 |
| TW | 201001331 | 1/2010 |
| TW | 201118420 | 6/2011 |
| TW | 201121302 | 6/2011 |
| TW | 201142464 | 12/2011 |
| WO | 01/88598 | 11/2001 |

OTHER PUBLICATIONS

Jung et al., "Reconstruction of three-dimensional occluded object using optical flow and triangular mesh reconstruction in integral imaging," Optics Express, Dec. 6, 2010, pp. 26373-26387.

"Office Action of China Counterpart Application", issued on Nov. 2, 2014, p. 1-p. 8.

"Office Action of Taiwan Counterpart Application", issued on Jan. 20, 2014, p. 1-p. 5.

* cited by examiner

STEREOSCOPIC DISPLAY SYSTEM AND IMAGE DISPLAY METHOD THEREOF

CROSS-REFERENCE TO RELATED APPLICATION

This application claims the priority benefit of Taiwan application serial no. 100149619, filed on Dec. 29, 2011. The entirety of the above-mentioned patent application is hereby incorporated by reference herein and made a part of this specification.

TECHNICAL FIELD

The disclosure relates to a display system and an image display method thereof, in particular, to a stereoscopic display system and an image display method thereof.

BACKGROUND

The currently most common method for manufacturing a 3D display is as follows. A panel of a flat display is used, and combines with an optical element being a lenticular plate of a parallax barrier. According to the design of the optical element, different pixels on the panel of the flat display are guided to different directions, which converge in a space to form a specific area called a view-zone. The pixels are divided into a plurality of groups according to the directions to which the pixels are guided, and the number of groups is the number of view-zones. When left and right eyes of a viewer are in adjacent view-zones, a stereoscopic impression is obtained. The manner is called a parallax type 3D display.

For the parallax type 3D display of the manner, design is based on the view-zone, and images of different perspectives converge on corresponding view-zone points, so that parallax is incurred to the two eyes, and the stereoscopic impression is produced. The design achieves an optimal viewing effect on designed view points, but outside the designed view points, the stereoscopic visual effect deteriorates rapidly. When the number of the designed view-zones is small, rapid and violent fluctuation often causes motion parallax to be flipping severely. Additionally, a spatial location of an object changes as a location of the viewer changes, and the feature is likely to incur comfortlessness and an unnatural impression during the viewing.

In order to eliminate discontinuity of the parallax type 3D display, an integral imaging 3D display employs a different display principle. Different from the optical design of concentrating light, in which pixel images of the same group converge on the other side of a screen to produce view-zones, the integral imaging 3D display adopts an optical design concept of parallel light. Each unit pitch of an optical element in a horizontal direction is an integer multiple of a pixel size in the horizontal direction, and a convergence point of rays emitted by screen image pixels through a plurality of micro cylindrical lenses is used to display an object point. Pixel images of the same group are all emitted to the front of the screen in parallel. The rays are all parallel and overlap, so that a stable stereoscopic visual effect is achieved, and the phenomenon, in which image quality fluctuates dramatically as the viewer changes the viewing location or an object moves or even deforms as the viewer changes the location thereof, may be avoided. Therefore, motion parallax of the integral imaging 3D display appears to be smoother.

SUMMARY

A stereoscopic display system is introduced herein, which includes a display apparatus and an image guiding plate. The display apparatus provides a plurality of diverge images. The display apparatus includes a plurality of stereoscopic display unit groups. Each of the stereoscopic display unit groups includes at least one stereoscopic display unit. Each of the stereoscopic display units includes a plurality of pixel groups. In each of the stereoscopic display units, the pixel groups provide a plurality of image beams corresponding to parts of the diverge images. Different stereoscopic display units correspond to the different parts of the diverge images. The image guiding plate is disposed on a transmission path of the image beams. The image guiding plate includes a plurality of optical structures arranged periodically, so as to respectively guide the image beams to a plurality of directions.

An image display method of a stereoscopic display system is introduced herein, which includes the following steps. A stereoscopic display system is provided. The stereoscopic display system includes a display apparatus and an image guiding plate. The display apparatus provides a plurality of diverge images, and includes a plurality of stereoscopic display units. Each of the stereoscopic display units includes a plurality of pixel groups. The pixel groups of the stereoscopic display units are configured to provide a plurality of image beams corresponding to parts of the diverge images. Different stereoscopic display units correspond to the different parts of the diverge images. The image guiding plate is used to respectively guide the image beams to a plurality of directions. The image guiding plate is disposed on a transmission path of the image beams. The image guiding plate includes a plurality of optical structures arranged periodically.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

An image display method according to exemplary embodiments is applicable to a stereoscopic display system designed based on any optical display principle. No matter an optical architecture of concentrated light or an optical architecture of parallel light, the image display method may always enable an image viewed with a single eye by a viewer to include bands being smaller in width and divided in a greater number of groups by providing a plurality of diverge images. Therefore, when the viewer moves laterally, the probability of a single point in an image viewed by the viewer to be replaced by a band increases, and motion parallax undergoes a more continuous change, so that the viewer may have a stereoscopic visual impression close to a real world. In order to make the disclosure be better understood, detailed descriptions are provided below with reference to the accompanying drawings and at least one exemplary embodiment.

Figure 1:
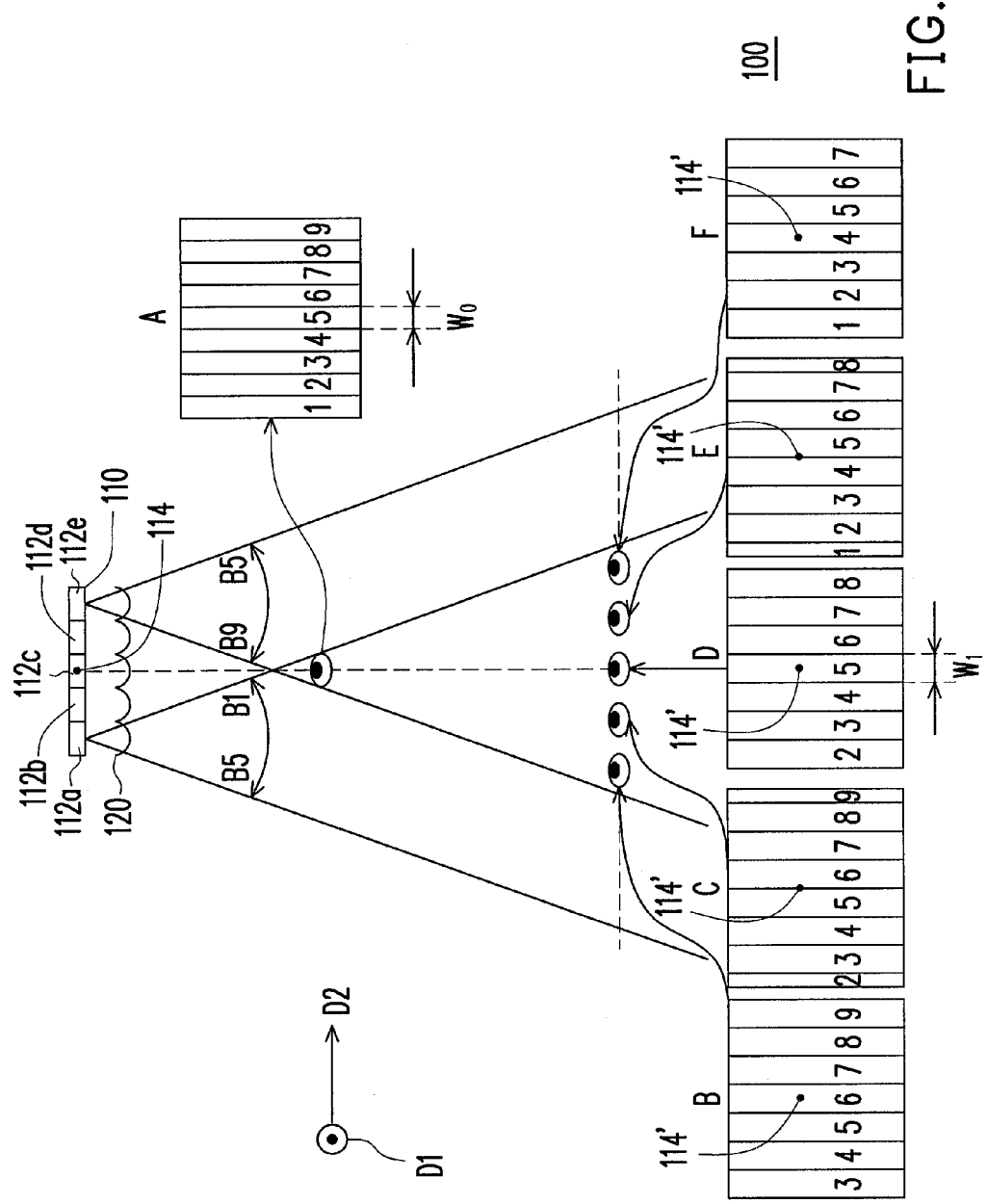
FIG. 1 is a schematic diagram illustrating a stereoscopic display system according to an embodiment.

FIG. 1 is a schematic diagram illustrating a stereoscopic display system according to an embodiment. Referring to FIG. 1, a stereoscopic display system 100 of the embodiment includes a display apparatus 110 and an image guiding plate 120. The display apparatus 110 includes a plurality of stereoscopic display unit groups. In the embodiment, each of the stereoscopic display unit groups respectively includes stereoscopic display units 112a to 112e, and each of the stereoscopic display units 112a to 112e includes a plurality of pixel groups. The stereoscopic display unit groups of the display apparatus 110 are configured to provide image beams of a plurality of diverge images. However, the disclosure is not limited thereto, and each of the stereoscopic display unit groups may be formed by one or more stereoscopic display units, the number of which depends on the number of designed image beams.

In the embodiment, the stereoscopic display units 112a to 112e are respectively used to provide image beams B1 to B9 of a plurality of diverge images 1 to 9. The image guiding plate 120 is disposed on a transmission path of the image beams B1 to B9, and is used to respectively guide the image beams B1 to B9 to a plurality of different directions. In the embodiment, pixel groups of the different stereoscopic display units provide different diverge images. Herein, for convenience of illustration, an image beam corresponding to each diverge image is provided with a parallax image number. Parallax image numbers 1 to 9 indicate that diverge images corresponding to image beams are images obtained when an object is observed from different angles. In the exemplary embodiment, the number of the diverge images provided by the display apparatus 110 is for illustrative purpose only, and the disclosure is not limited thereto.

The stereoscopic display unit 112a provides the image beams B1 to B5 corresponding to the diverge images 1 to 5; the stereoscopic display unit 112b provides the image beams B2 to B6 corresponding to the diverge images 2 to 6; the stereoscopic display unit 112c provides the image beams B3 to B7 corresponding to the diverge images 3 to 7; the stereoscopic display unit 112d provides the image beams B4 to B8 corresponding to the diverge images 4 to 8; and the stereoscopic display unit 112e provides the image beams B5 to B9 corresponding to the diverge images 5 to 9. In FIG. 1, in order to make the drawing be concise, only the image beams B1 to B5 provided by the stereoscopic display unit 112a and the image beams B5 to B9 provided by the stereoscopic display unit 112e are illustrated. Through the image display method, images viewed with a single eye of the viewer in different locations at least include parts or all of the diverge images, so as to form a stereoscopic visual image.

For example, images viewed with a single eye of the viewer in a location A include 9 bands, which respectively correspond to diverge images with the parallax image numbers being 1 to 9. Images viewed with a single eye of the viewer in locations C and E include 8 bands, which respectively correspond to diverge images with the parallax image numbers being 2 to 9 and diverge images with the parallax image numbers being 1 to 8. Images viewed with a single eye of the viewer in locations B, D and F include 7 bands, which respectively correspond to diverge images with the parallax image numbers being 3 to 9, 2 to 8, and 1 to 7.

In the embodiment, compared with a band 5 with the width being $W_0$ in the location A, a band 5 in the location B has the width being $W_1$, and $W_1$ is greater than $W_0$. Compared with bands 2 to 8 having the same width in the location D, bands 3 to 8 in the location C each have the width substantially approximately equal to $W_1$, and bands 2 and 9 in the location C each have the width smaller than $W_1$ or being a half of the width being $W_1$. Further, compared with the bands 2 to 8 in the location D, bands 3 to 9 in the location B each have the width substantially approximately equal to $W_1$. Similarly, a distribution mode of bands in the locations E and F may be deduced according to the above rules, which is not repeated herein. On the other hand, for a single image point 114 on the display apparatus 110, a corresponding point 114' thereof on viewer images is in the bands 6, 5, and 4 in sequence from the location B to the location F.

Therefore, in the embodiment, the stereoscopic display units 112a to 112e each provide the same number of diverge images, but the provided diverge images have different parallax image numbers. Compared with that in the prior art, the numbers of the bands of the images viewed with a single eye of the viewer in the locations A to F are all larger, and the bands all have the width being smaller, so that the frequency of update of the single image point is increased. That is to say, the diverge images used in the stereoscopic display system of the embodiment may improve smoothness of the motion parallax. In addition, the stereoscopic display system of the embodiment may provide a stereoscopic vision closer to being natural without changing parameters of any optical display element in the prior art, if only corresponding diverge images thereof are available.

Figure 2:
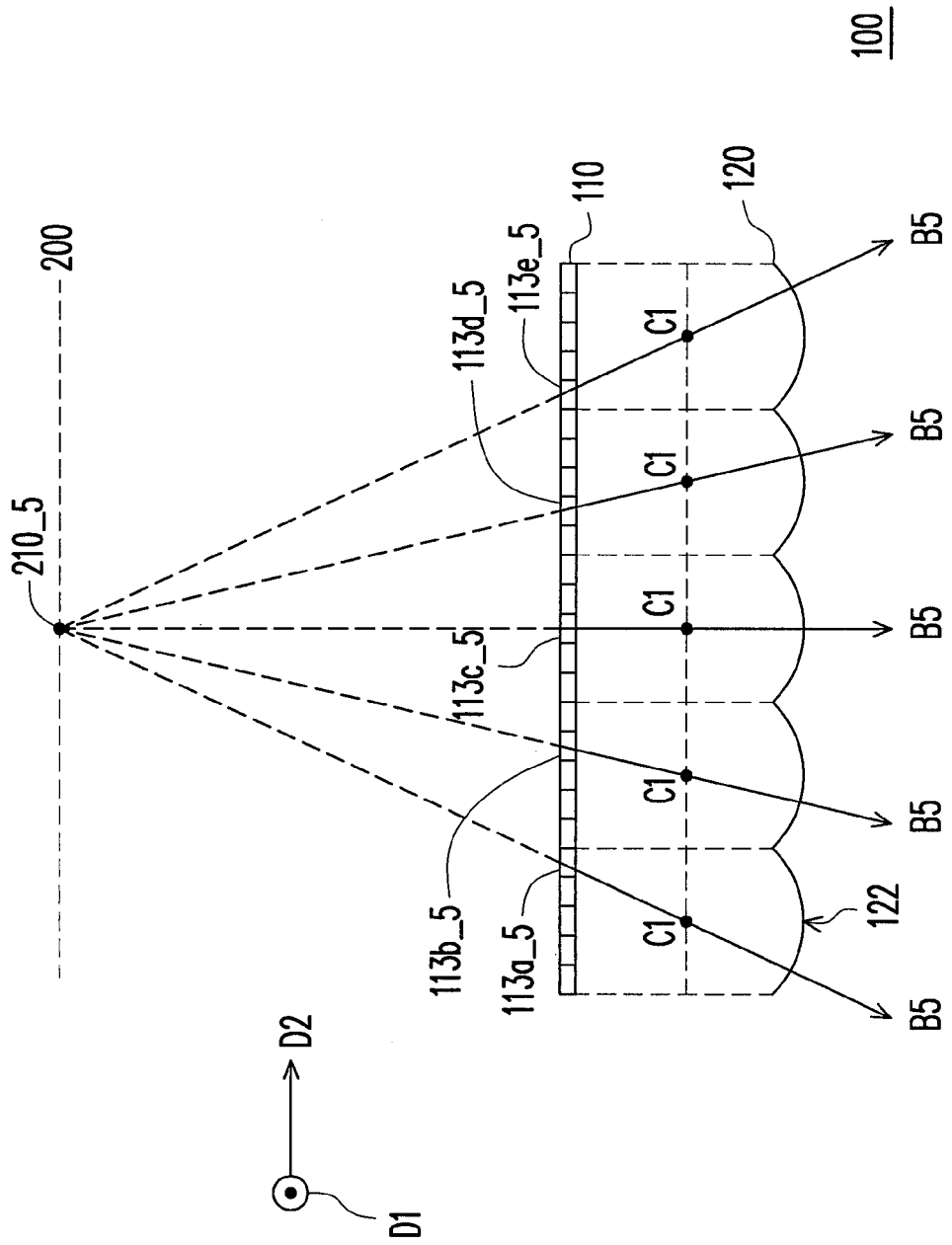
FIG. 2 is a schematic diagram illustrating details of the stereoscopic display system of FIG. 1.
Figure 3A:
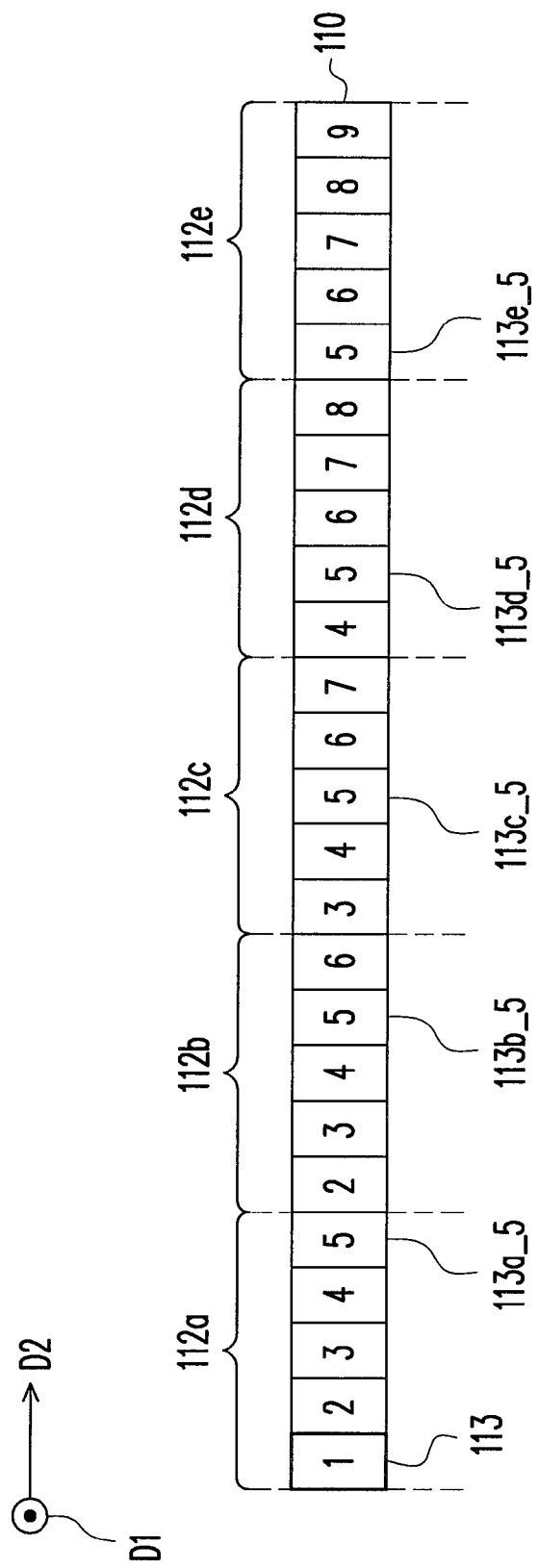
FIG. 3A is a schematic diagram illustrating pixel groups in stereoscopic display units of FIG. 1.

Further, FIG. 2 is a schematic diagram illustrating details of the stereoscopic display system of FIG. 1. FIG. 3A is a schematic diagram illustrating pixel groups in the stereoscopic display units of FIG. 1. Referring to FIG. 2 and FIG.

3A, in the embodiment, each of the stereoscopic display units 112a to 112e includes a plurality of pixel groups 113. In each of the stereoscopic display units, the pixel groups respectively correspond to different parts of the diverge images, so as to provide a plurality of image beams. The image guiding plate 120 is disposed on the transmission path of the image beams, and includes a plurality of optical structures 122 arranged periodically according to a single cycle, so as to respectively guide the image beams to a plurality of different directions.

For example, the stereoscopic display unit 112a includes five pixel groups 113, which are respectively used to provide the image beams B1 to B5. In FIG. 3A, the parallax image number marked on each of the pixel groups represents the diverge image corresponding to the image beam provided by the pixel group. The number 113a_5 indicates that a pixel group 113a_5 of the stereoscopic display unit 112a provides the image beam B5 corresponding to the diverge image 5. An implementation mode of the other stereoscopic display units 112b to 112e may be deduced according to the above rules. Herein, the stereoscopic display units 112a to 112e each include five pixel groups, but the disclosure is not limited thereto.

In the embodiment, pixel groups of the stereoscopic display unit 112a provides the image beams B1 to B5 corresponding to the diverge images 1 to 5 in sequence; pixel groups of the stereoscopic display unit 112b provides the image beams B2 to B6 corresponding to the diverge images 2 to 6 in sequence; pixel groups of the stereoscopic display unit 112c provides the image beams B3 to B7 corresponding to the diverge images 3 to 7 in sequence; pixel groups of the stereoscopic display unit 112d provides the image beams B4 to B8 corresponding to the diverge images 4 to 8 in sequence; and pixel groups of the stereoscopic display unit 112e provides the image beams B5 to B9 corresponding to the diverge images 5 to 9 in sequence. In other words, in the embodiment, the stereoscopic display units 112a to 112e each provide the same number of diverge images, but the provided diverge images have different parallax image numbers.

In addition, according to FIG. 3A, in the embodiment, the stereoscopic display units 112a to 112e each include the pixel group for providing the image beam B5 corresponding to the diverge image 5, which is the pixel groups 113a_5, 113b_5, 113c_5, 113d_5 and 113e_5. In the first stereoscopic display unit 112a, the image beam B5 of the diverge image 5 is provided by the fifth pixel group 113a_5; in the second stereoscopic display unit 112b, the image beam B5 of the diverge image 5 is provided by the fourth pixel group 113b_5, and so on. That is to say, in the embodiment, the parts of the diverge images corresponding to different stereoscopic display units include a specific diverge image among the diverge images. Herein, illustration is provided by using an example in which the specific diverge image is the diverge image 5, but the disclosure is not limited thereto.

Figure 3B:
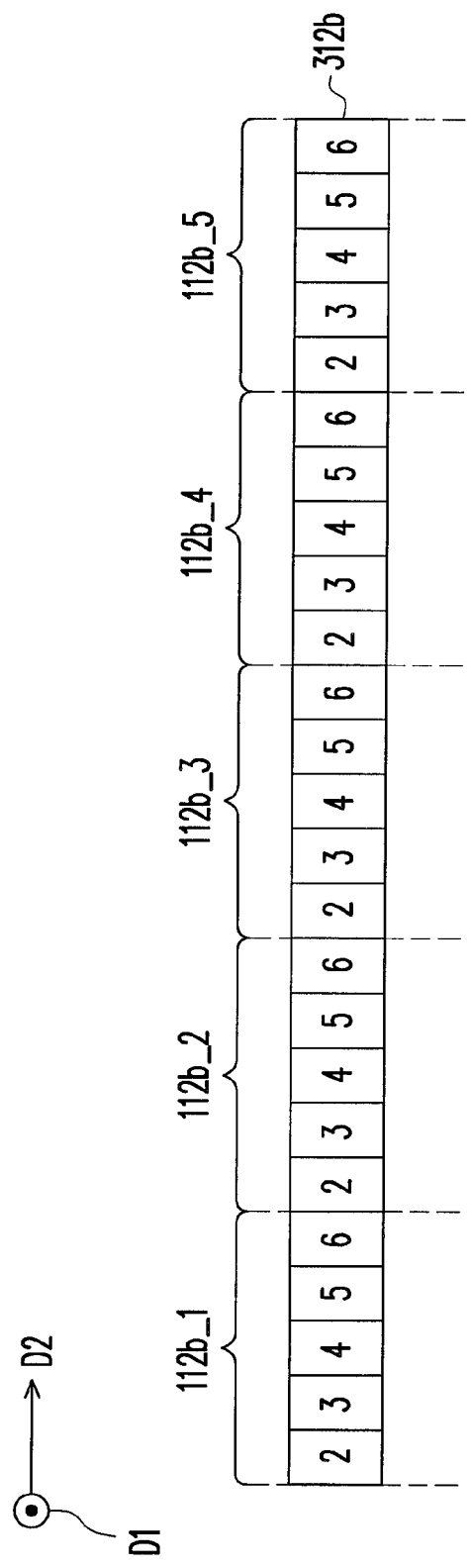
FIG. 3B is a schematic diagram illustrating a plurality of stereoscopic display units 112b included in a second stereoscopic display unit group of FIG. 3A.

In the embodiment, each of the stereoscopic display unit groups may be formed by one or more stereoscopic display units. A specific diverge image n in an $i^{th}$ stereoscopic display unit group is provided by a $j^{th}$ pixel group of each of the stereoscopic display units. Herein, for example the number of the pixel groups is m, and i, j, m and n are natural numbers, j≤m, and i+j=n+1. In the embodiment, for convenience of illustration, each of the stereoscopic display unit groups includes one stereoscopic display unit. For example, FIG. 3B is a schematic diagram illustrating a plurality of stereoscopic display units 112b included in the second stereoscopic display unit group of FIG. 3A. In the embodiment, a stereoscopic display unit group 312b includes a plurality of stereoscopic display units 112b_1 to 112b_5. Each of the stereoscopic display units includes five pixel groups (that is, M=5), and the fourth pixel group (j=4) of each of the stereoscopic display units in the second stereoscopic display unit group (i=2) provides the specific diverge image 5 (N=5), so that i, j and N satisfy i+j=N+1. Similarly, in another embodiment, if each of the stereoscopic display units includes eight pixel groups (that is, M=8), and the fourth pixel group (j=4) of each of the stereoscopic display units in the third stereoscopic display unit group (i=3) provides a specific diverge image 6 (N=6), so that i, j and N satisfy i+j=N+1.

On the other hand, in the embodiment, after the image beams B5 provided by the pixel groups 113a_5, 113b_5, 113c_5, 113d_5 and 113e_5 are guided by the periodically arranged optical structures corresponding to the stereoscopic display units thereof respectively, extension lines, which are opposite to traveling directions, of the image beams B5 converge on a side of the display apparatus 110 without the image guiding plate 120, as shown in FIG. 2. In the embodiment, the image guiding plate 120 is, for example, a lenticular plate, and each optical structure 122 is a cylindrical lens. Therefore, according to the perspective in which FIG. 2 is provided, a cross section of each of the optical structures 122 includes an arc, and each of the arcs has a corresponding center C1. The image beam B5 guided by each of the optical structures 122 passes through the center C1 of the corresponding arc thereof. Further, the extension lines, which are opposite to the traveling directions, of the image beams B5 converge on a diverge point 210_5 on the side of the display apparatus 110 without the image guiding plate 120.

Figure 4:
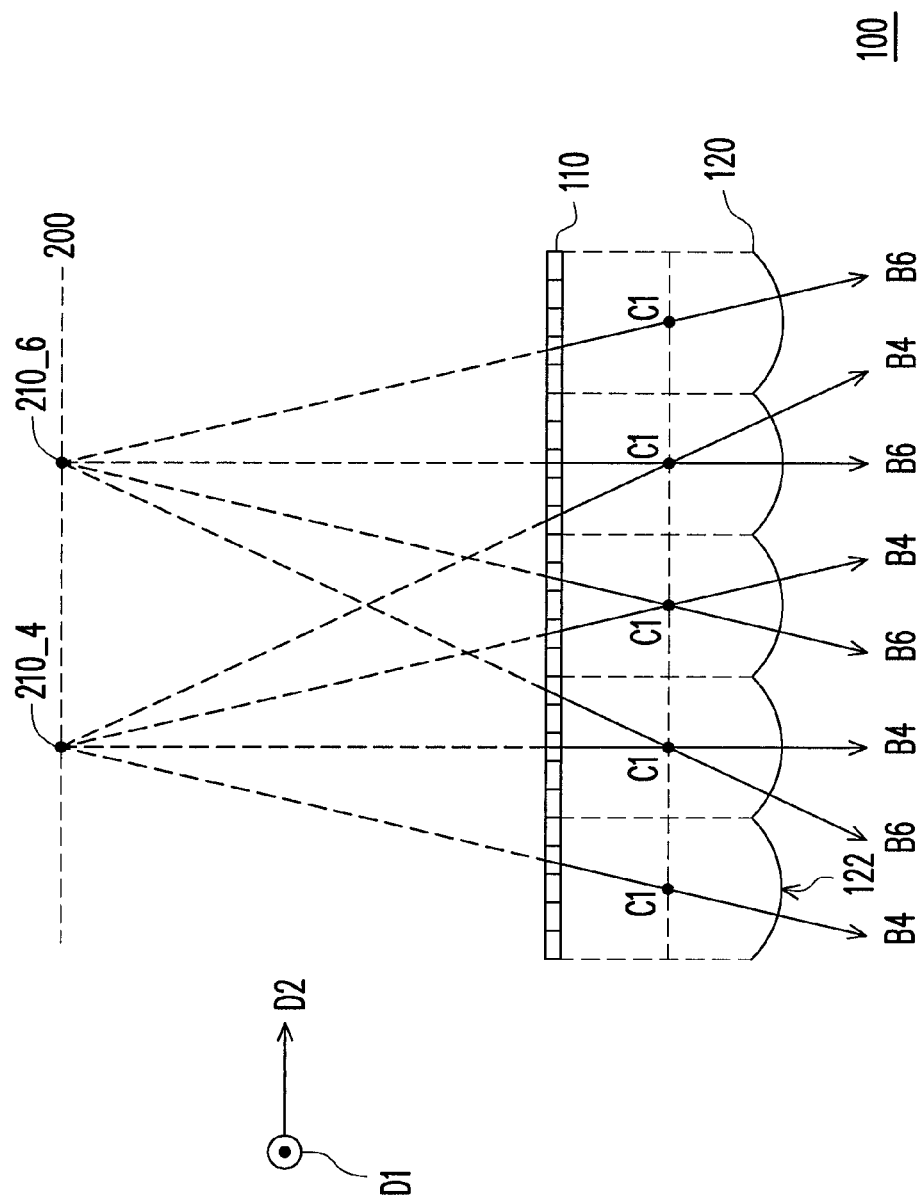
FIG. 4 is a schematic diagram illustrating details of the stereoscopic display system of FIG. 1.

From another point of view, FIG. 4 is a schematic diagram illustrating details of the stereoscopic display system of FIG. 1. Referring to FIG. 2 to FIG. 4, in the embodiment, in addition to that the extension lines of the image beams B5 converge on the diverge point 210_5, in the stereoscopic display units 112a to 112e, extension lines, which are opposite to traveling directions, of image beams, provided by the pixel groups corresponding to the same diverge image also converge on the side of the display apparatus 110 without the image guiding plate 120, and form a diverge point.

In the stereoscopic display units 112a to 112e, the extension lines, which are opposite to the traveling directions, of the image beams B6 provided by the pixel groups corresponding to the same diverge image 6, that is, the pixel groups in FIG. 3A marked with the parallax image number being 6, converge on the side of the display apparatus 110 without the image guiding plate 120, and form a diverge point 210_6. Similarly, the extension lines, which are opposite to the traveling directions, of the image beams B4 provided by the pixel groups corresponding to the same diverge image 4, that is, the pixel groups in FIG. 3A marked with the parallax image number being 4, converge on the side of the display apparatus 110 without the image guiding plate 120, and form a diverge point 210_4. Referring to FIG. 2, the diverge points 210_4, 210_5 and 210_6 are distributed on a straight line 200 on the side of the display apparatus 110 without the image guiding plate 120. Diverge points corresponding to the diverge images 2, 3, 7 and 8 are also distributed on the straight line 200 (not shown). To make the drawings be concise, FIG. 2 and FIG. 4 illustrate the diverge points 210_4, 210_5 and 210_6 formed by concentrating the image beams B4 to B6 respectively. The diverge points formed by concentrating the image beams B2, B3, B7 and B8 respectively may be illustrated according to the above optical principle. In the embodiment, the diverge points formed by concentrating the image beams B2 to B8 respectively are distributed on a straight line, but the disclosure is not limited thereto. In other embodiments, the diverge points formed by concentrating the image beams B2 to B8 respectively may be distributed on a curve.

Figure 5:
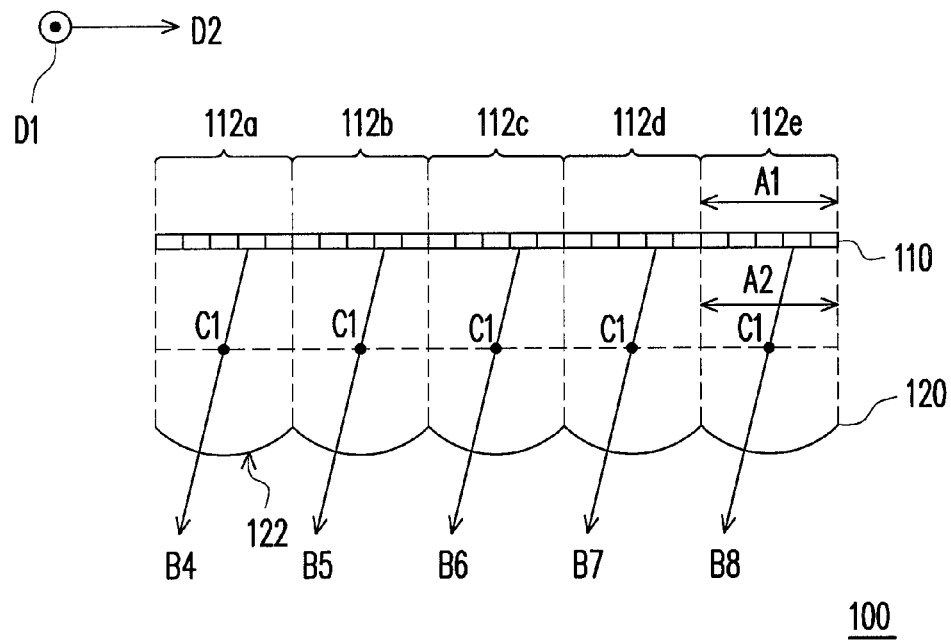
FIG. 5 is a schematic diagram illustrating details of the stereoscopic display system of FIG. 1.

On the other hand, the stereoscopic display system 100 of the embodiment is designed based on the optical architecture of parallel light. After being emitted from the image guiding plate 120, the image beams provided by $k^{th}$ pixel groups of the stereoscopic display units 112a to 112e are substantially parallel to one another, where k is a natural number smaller than or equal to 5. FIG. 5 is a schematic diagram illustrating details of the stereoscopic display system of FIG. 1. Referring to FIG. 3A and FIG. 5, in the embodiment, for example, the fourth pixel groups in the stereoscopic display units 112a to 112e provide the image beams B4 to B8 respectively. The image beams B4 to B8 are substantially parallel to each other after passing through centers C1 of the corresponding arcs 122 thereof respectively, as shown in FIG. 5. In order to achieve the optical design architecture of parallel light, in an implementation mode of the stereoscopic display system 100 of the embodiment, the width A1 of the stereoscopic display unit is substantially equal to a cycle A2 of the optical structures (that is, the arcs) of the image guiding plate 120.

Figure 6:
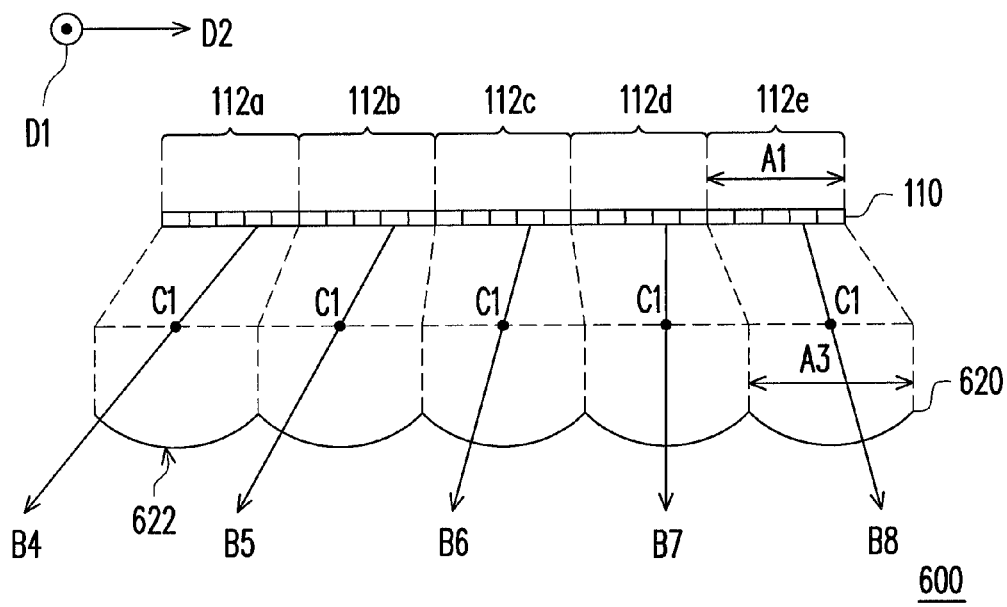
FIG. 6 is a schematic diagram illustrating details of a stereoscopic display system according to another embodiment.

However, the stereoscopic display system of the embodiment is not limited to the optical architecture of parallel light, and in other embodiments, the stereoscopic display system may be designed based on an optical architecture of divergent light or concentrated light. FIG. 6 is a schematic diagram illustrating details of a stereoscopic display system according to another embodiment. Referring to FIG. 6, in the embodiment, for example, the fourth pixel groups in the stereoscopic display units 112a to 112e provide the image beams B4 to B8 respectively. The image beams B4 to B8 diverge in different directions after passing through centers C1 of corresponding arcs 622 thereof respectively, as shown in FIG. 6. In order to achieve the optical design architecture of divergent light, in an implementation mode of a stereoscopic display system 600 of the embodiment, the width A1 of the stereoscopic display unit is substantially greater than a cycle A3 of optical structures 622 (that is, arcs) of an image guiding plate 620.

Figure 7:
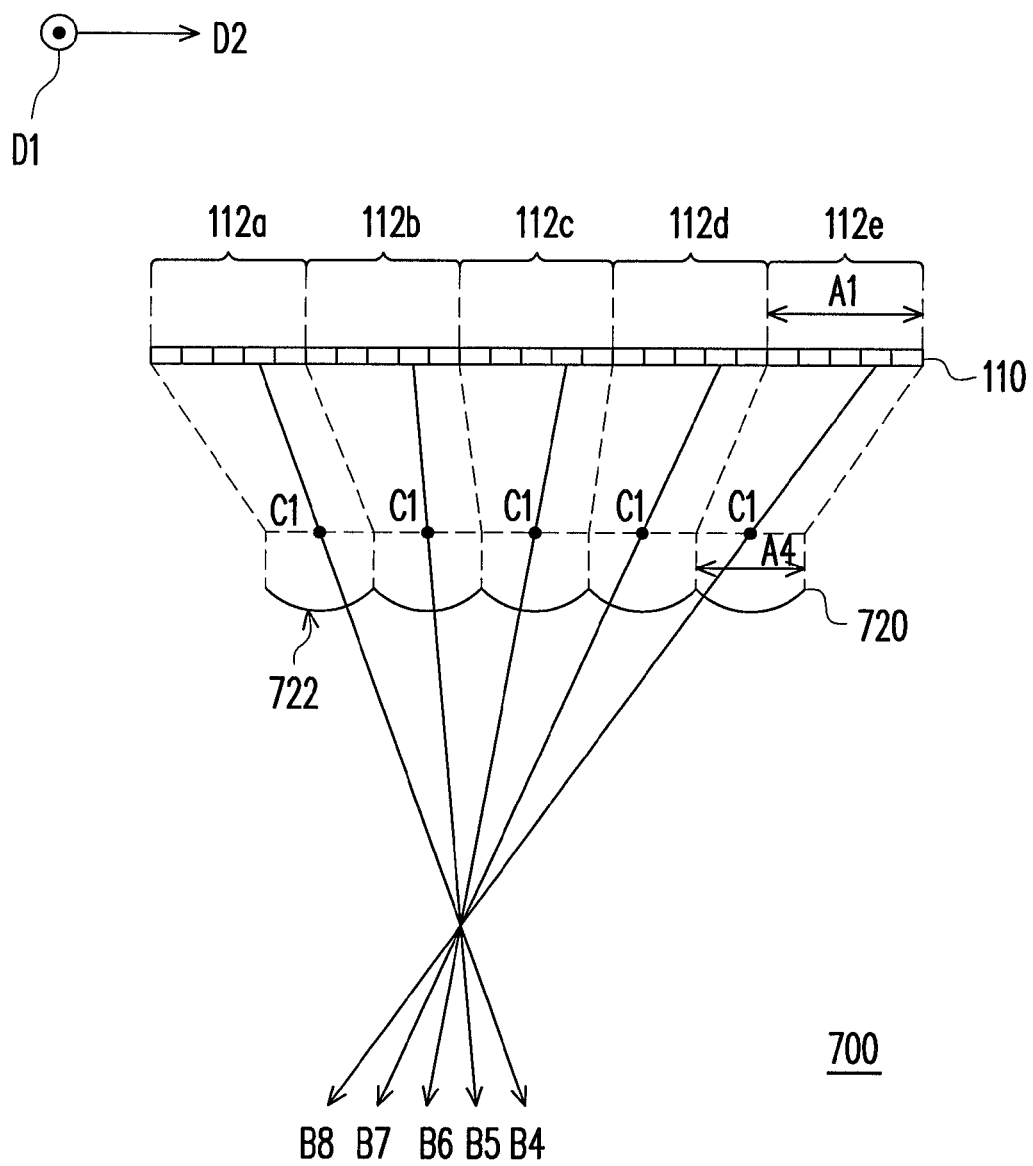
FIG. 7 is a schematic diagram illustrating a stereoscopic display system according to another embodiment.

FIG. 7 is a schematic diagram illustrating details of a stereoscopic display system according to another embodiment. Referring to FIG. 7, in the embodiment, for example, the fourth pixel groups in the stereoscopic display units 112a to 112e provide the image beams B4 to B8 respectively. The image beams B4 to B8 converge on an area in a space, for example, a point in the space, after passing through centers C1 of corresponding arcs 722 thereof respectively, as shown in FIG. 7. In order to achieve the optical design architecture of concentrated light, in an implementation mode of a stereoscopic display system 700 of the embodiment, the width A1 of the stereoscopic display unit is smaller than a cycle A4 of optical structures 722 (that is, arcs) of an image guiding plate 720.

Figure 8:
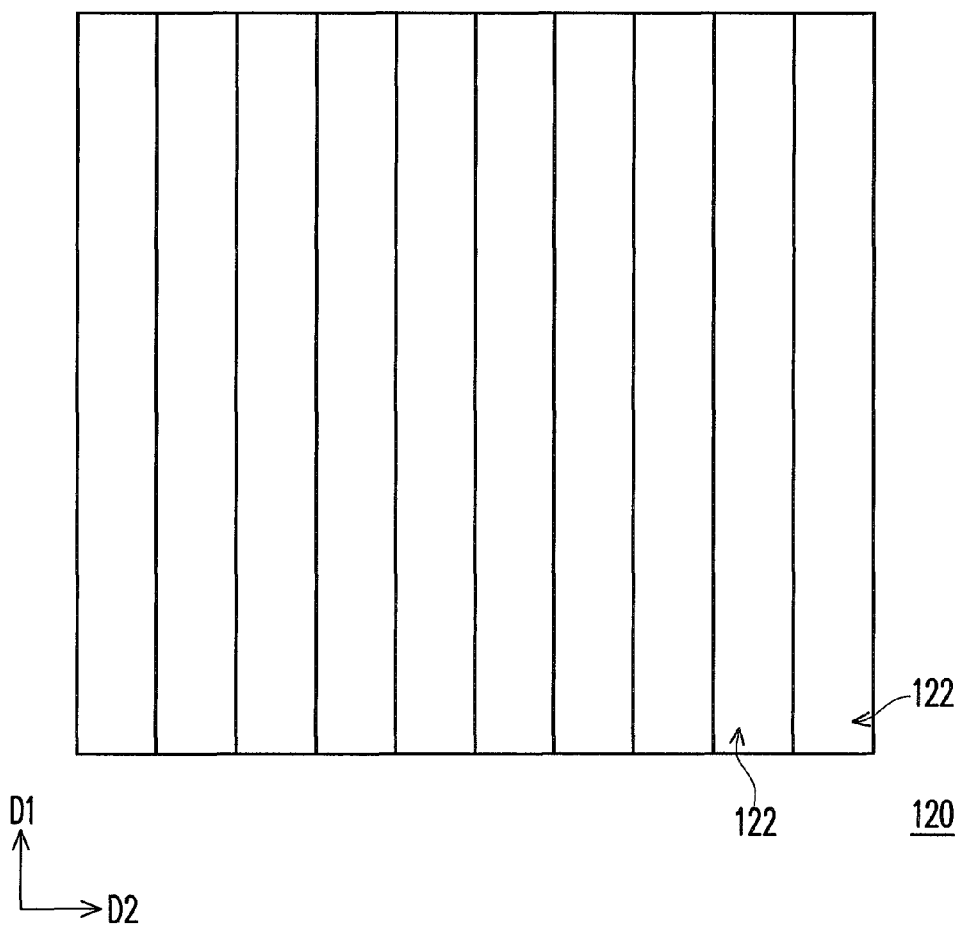
FIG. 8 is a front view of an image guiding plate of FIG. 1.

FIG. 8 is a front view of an image guiding plate of FIG. 1. Herein, a so-called front view direction refers to a direction in which a viewer views the stereoscopic display system. Referring to FIG. 1 and FIG. 8, in the embodiment, the image guiding plate 120 is, for example, a lenticular plate, and each of the optical structures 122 is, for example, a cylindrical lens. Each of the optical structures 122 extends along a first direction D1, and the optical structures 122 are arranged along a second direction D2. In the embodiment, the cylindrical lens refers to a lens having a surface which is bent in one direction and is not bent in another direction perpendicular to the direction. For example, in the embodiment, a surface of the optical structure 122 is not bent in the first direction D1, and is bent in the second direction D2. In the embodiment, the first direction D1 is substantially perpendicular to the second direction D2. However, in other embodiments, the first direction D1 may not be perpendicular to the second direction D2.

Figure 9:
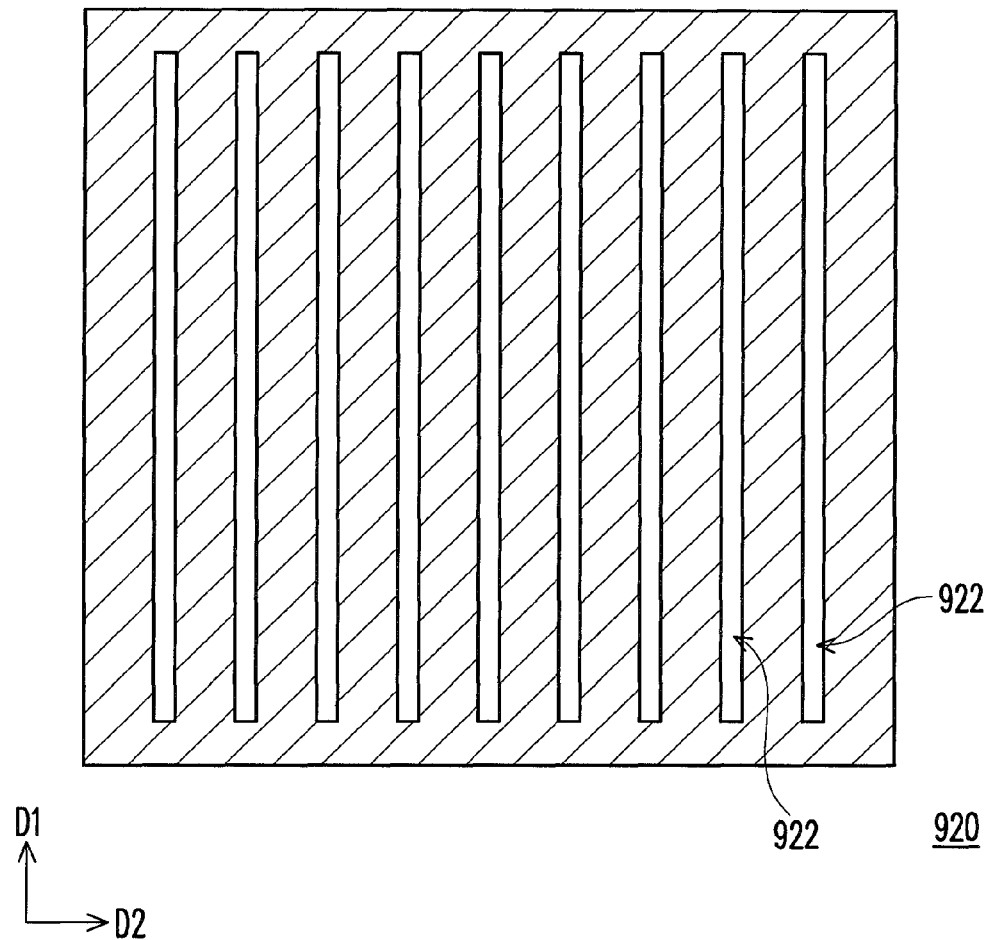
FIG. 9 is a front view of an image guiding plate according to another embodiment.

FIG. 9 is a front view of an image guiding plate according to another embodiment. Referring to FIG. 1 and FIG. 9, in the embodiment, an image guiding plate 920 is a barrier, each optical structure 922 is a slit, each of the slits extends along the first direction D1, and the slits are arranged along the second direction D2. In the embodiment, the first direction D1 is substantially perpendicular to the second direction D2. However, in other embodiments, the first direction D1 may not be perpendicular to the second direction D2. The slits of the barrier may allow light to pass through, but other parts of the barrier other than the slits block rays.

In the exemplary embodiments of FIG. 8 and FIG. 9, the image guiding plates are both one-dimensional light splitting elements. Therefore, by using the one-dimensional light splitting element of FIG. 8 or FIG. 9 in combination with diverge images shot by using the corresponding image guiding plate of FIG. 8 or FIG. 9, excellent motion parallax may be achieved in the horizontal direction.

Figure 10A:
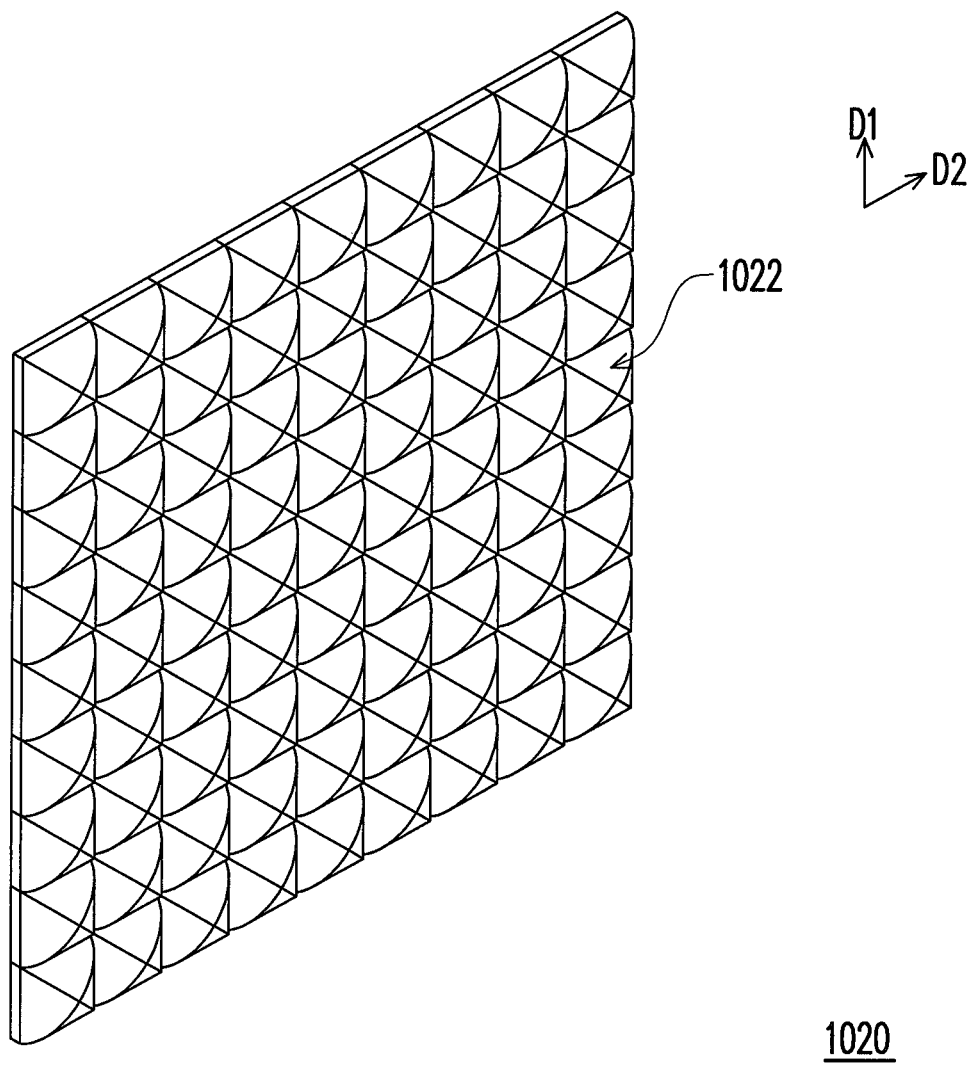
FIG. 10A is a front view of an image guiding plate according to another embodiment.

FIG. 10A is a front view of an image guiding plate according to another embodiment. Referring to FIG. 1 and FIG. 10A, in the embodiment, an image guiding plate 1020 is, for example, a lens array plate, each optical structure 1022 is a lens, and the lenses are arranged in a two-dimensional array.

Figure 10B:
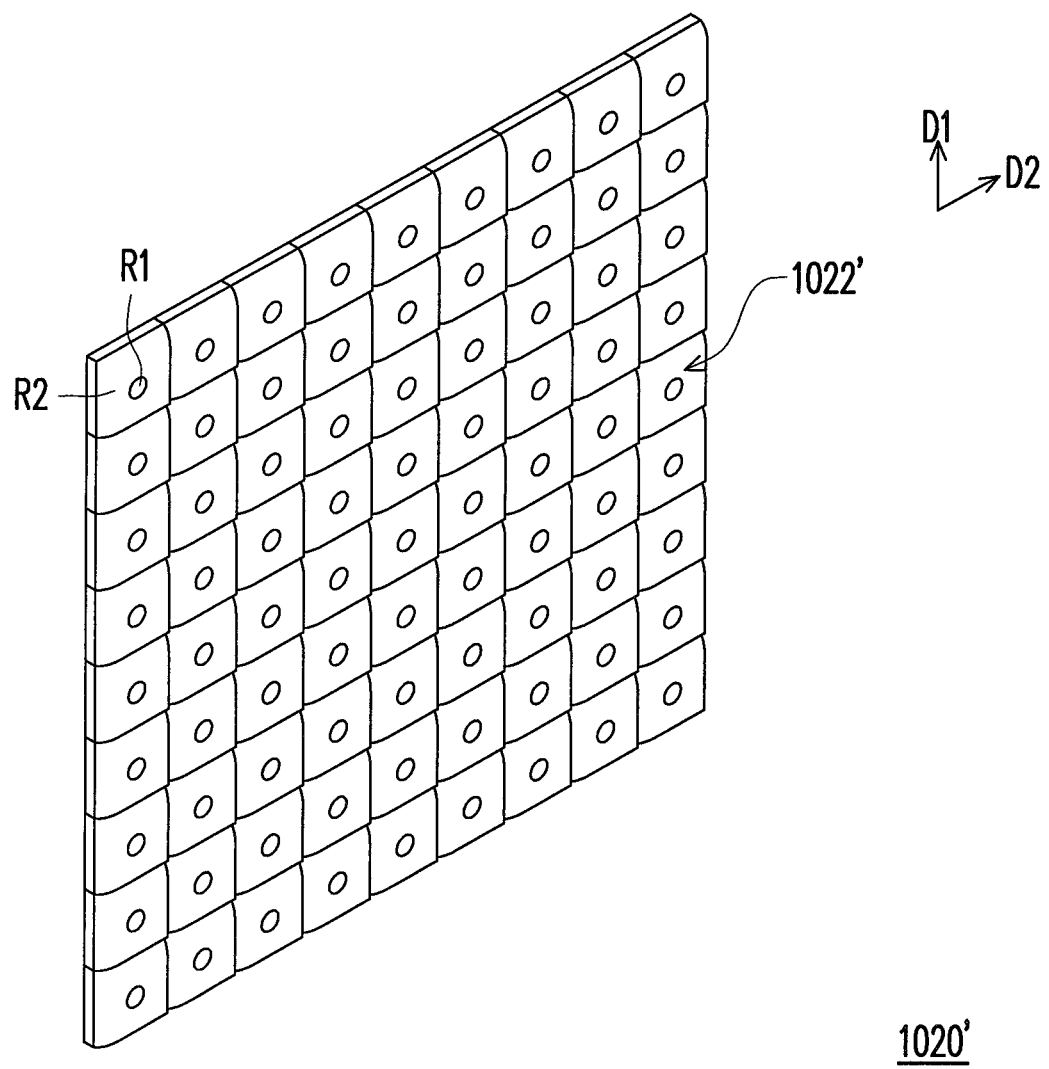
FIG. 10B is a front view of an image guiding plate according to another embodiment.

FIG. 10B is a front view of an image guiding plate according to another embodiment. Referring to FIG. 1 and FIG. 10B, in the embodiment, an image guiding plate 1020' is, for example, a two-dimensional barrier array, each optical structure 1022' includes a light transmitting area R1 and a light blocking area R2, and the optical structures 1022' are arranged in a two-dimensional array.

In the exemplary embodiments of FIG. 10A and FIG. 10B, the image guiding plates are both two-dimensional light splitting elements. If a light splitting element of a stereoscopic display system is two-dimensional, parallax thereof is also two-dimensional. Therefore, for diverge images, image acquisition elements (micro lens) at a shooting end are also required to be two-dimensional. Further, by using the two-dimensional light splitting elements in combination with diverge images shot by using the corresponding image guiding plates of FIG. 10A and FIG. 10B, excellent motion parallax may be achieved in both the horizontal direction and the vertical direction.

Figure 11:
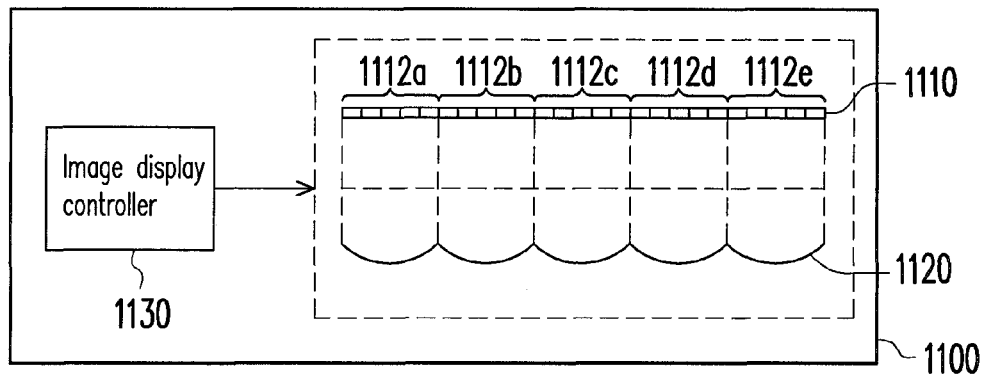
FIG. 11 is a schematic diagram illustrating a stereoscopic display system according to another embodiment.
Figure 12:
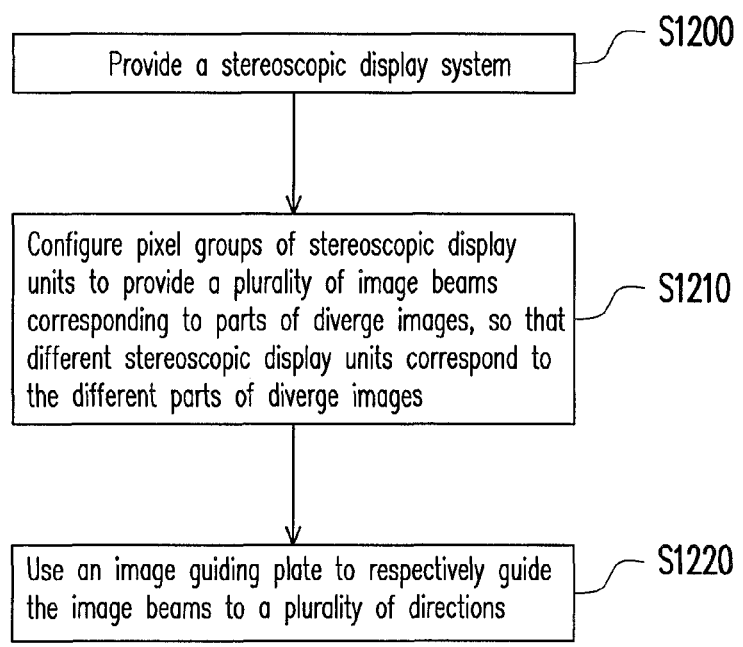
FIG. 12 is a flow chart of an image display method of a stereoscopic display system according to an embodiment.

FIG. 11 is a schematic diagram illustrating a stereoscopic display system according to another embodiment. FIG. 12 is a flow chart of an image display method of a stereoscopic display system according to an embodiment. Referring to FIG. 1, FIG. 11 and FIG. 12, a stereoscopic display system 1100 of the embodiment is similar to the stereoscopic display system 100 of FIG. 1, and differences therebetween are as follows. A stereoscopic display system 1100 further includes an image display controller 1130 for controlling and driving a display apparatus 1110, so that stereoscopic display units 1112a and 1112e each provides the same number of diverge images, but the diverge images have different parallax image numbers. In Step S1200, a stereoscopic display system 1100 is provided. Then, in Step S1210, pixel groups of stereoscopic display units 1112a to 1112e are configured to provide a plurality of image beams corresponding to parts of diverge images. Herein, different stereoscopic display units correspond to different parts of diverge images. Then in Step S1220, an image guiding plate 1120 is used to respectively guide the image beams to a plurality of directions. In the embodiment, the stereoscopic display system 1100 may be a flat display or a curved display. In other words, the image display method illustrated by FIG. 12 may be applied to a stereoscopic display system of a flat display or a curved display, and the disclosure is not limited thereto.

Further, enough teachings, advice and implementation instructions of the image display method of the embodiment may be obtained from the descriptions of the embodiments of FIG. 1 to FIG. 10B, which are not repeated herein.

Figure 13:
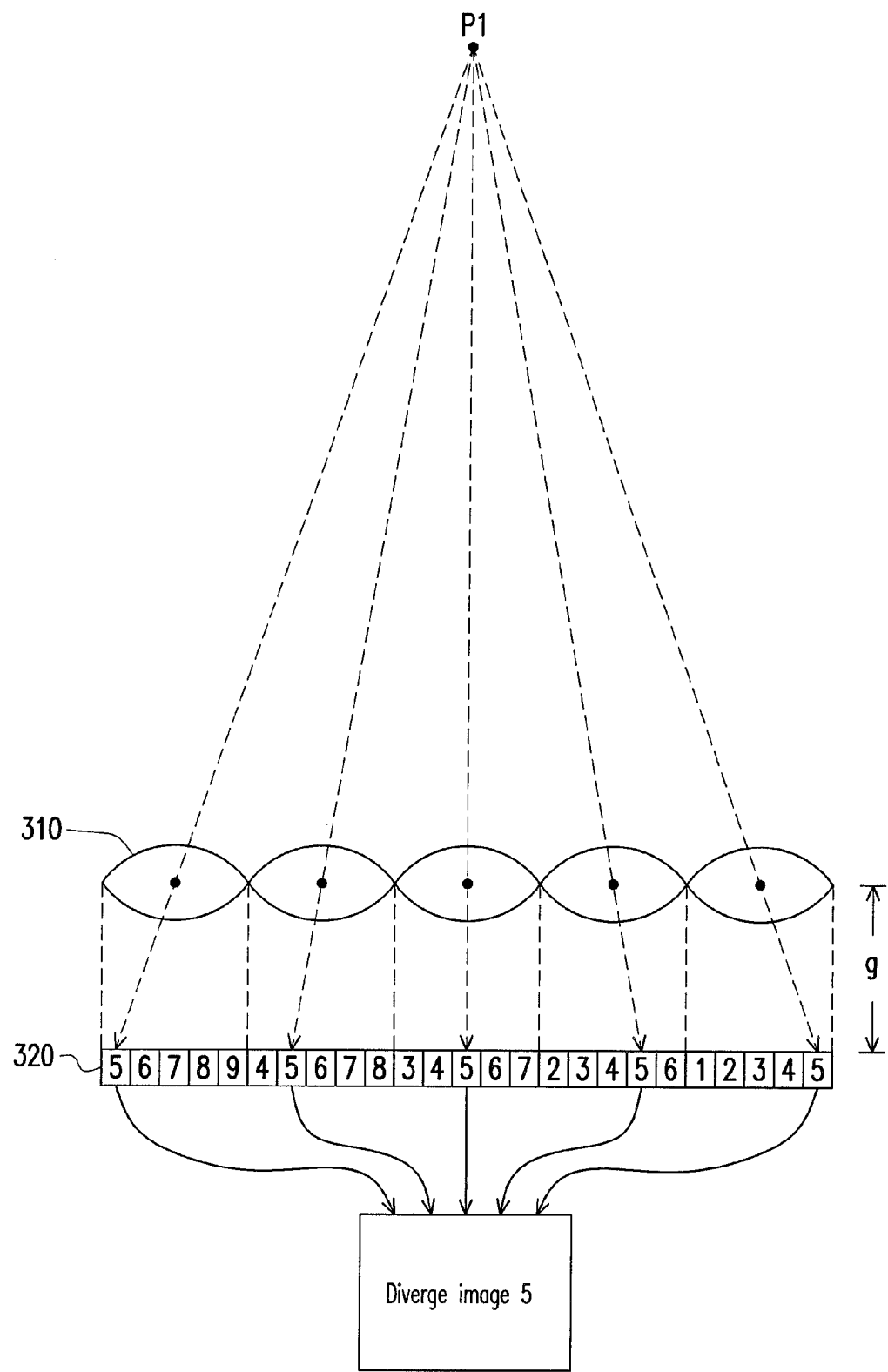
FIG. 13 is a schematic diagram illustrating a shooting manner of a diverge image according to an embodiment.

FIG. 13 is a schematic diagram illustrating a shooting manner of a diverge image according to an embodiment. Referring to FIG. 13, a shooting architecture of a diverge image of the embodiment mainly includes a lens array 310 on the same plane and an image sensor 320. Each lens of the lens array 310 has a corresponding sensing block thereunder, and each sensing block is a group of stereoscopic pixels. According to FIG. 13, stereoscopic pixel groups from left to right respectively include pixels with parallax image numbers being 5 to 9, 4 to 8, 3 to 7, 2 to 6, and 1 to 5. A diverge image is taken as an example. According to projection lines in FIG. 13 (dotted lines in the drawing), locations with the number being 5 record diverge image information of a diverge point P1 in FIG. 13, the locations with the number being 5 are distributed in different locations in corresponding stereoscopic pixel groups thereof. The operation is similar to that diverge image information of the diverge point P1 is sampled in different locations, and all pixels with the number being 5 are combined to form a diverge image with the number being 5.

Figure 14:
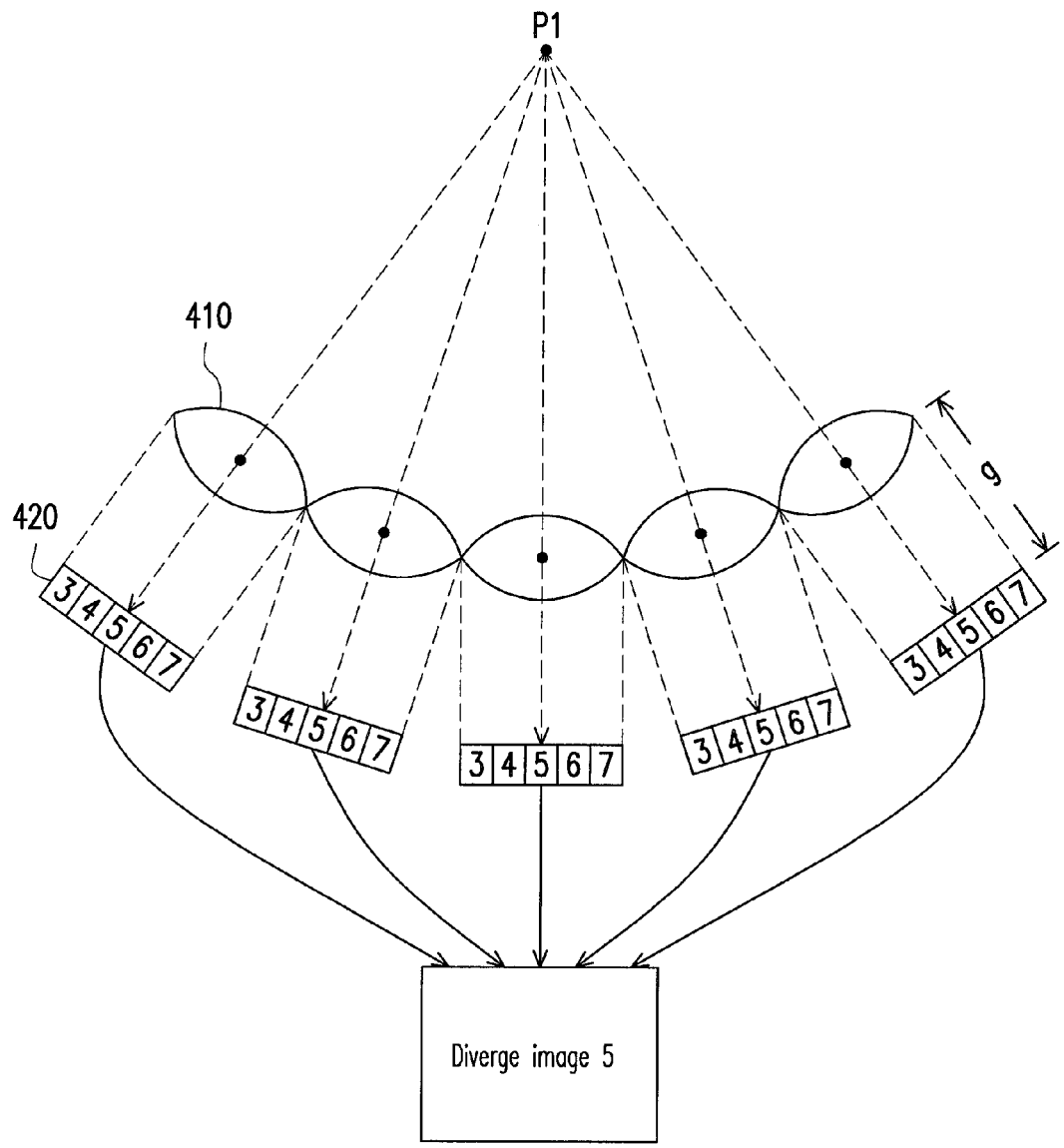
FIG. 14 is a schematic diagram illustrating a shooting manner of a diverge image according to another embodiment.

FIG. 14 is a schematic diagram illustrating a shooting manner of a diverge image according to another embodiment. Referring to FIG. 14, in the embodiment, for convenience of sampling, lenses of a lens array 410 may be disposed on an arc, as shown in FIG. 14. Similarly, each of the lenses has a corresponding sensing block thereunder, and each sensing block is at the same distance, g, from the corresponding lens thereof. In the embodiment, each stereoscopic pixel group includes pixels with the parallax image numbers being 3 to 7. Similarly, a diverge image 5 is taken as an example. According to geometric principles of divergent projection, each sensing block at the location with the number being 5 records diverge image information of projection line of a diverge point P1 in FIG. 14.

Figure 15:
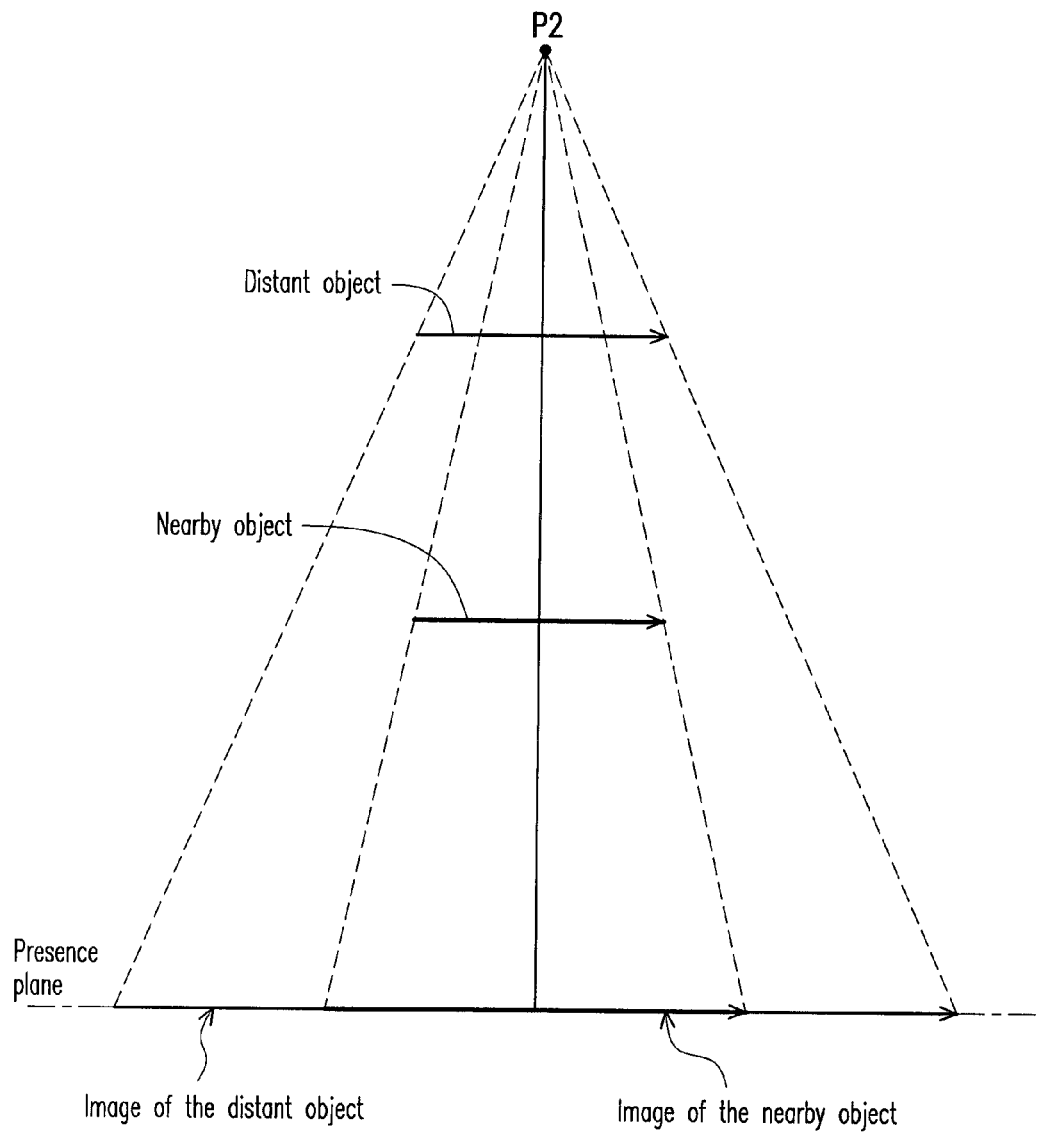
FIG. 15 is a schematic diagram illustrating a diverge image according to an embodiment.

At least based on the shooting manner of the diverge image, the diverge image of the exemplary embodiment is defined as follows. FIG. 15 is a schematic diagram illustrating a diverge image according to an embodiment. Referring to FIG. 15, in the projective geometry, when objects of the same size are in different locations, projections of the two objects on a presence plane are not the same in size. In FIG. 15, a distant object and a nearby object are two objects of the same size. A projection of the object (the nearby object), closer to the presence plane, on the presence plane is smaller than a projection of the object (the distant object), farther away from the presence plane, thereby indicating a feature of the closer the smaller. Therefore, if the projection lines (the dotted lines in the drawing) converge on a projection point P2 by extending towards a side where the object is disposed, divergent projection is achieved.

In view of the above, in the exemplary embodiments, the stereoscopic display units each provide the same number of diverge images, but the provided diverge images have different parallax image numbers. Compared with that in the prior art, the numbers of the bands of the images viewed with a single eye of the viewer in the different locations are all larger, and the bands all have the width being smaller, so that the frequency of update of the single image point is increased, thereby improving smoothness of the motion parallax. In addition, in the exemplary embodiments, the stereoscopic display system may provide a stereoscopic vision closer to being natural without changing parameters of any optical display element in the prior art, if only corresponding diverge images thereof are available. Further, in the exemplary embodiments, the stereoscopic display system may be designed based on the architecture of parallel light, divergent light or concentrated light.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereoscopic display system, comprising:
a display apparatus, providing a plurality of diverge images, wherein the display apparatus comprises:
a plurality of stereoscopic display unit groups, wherein each of the stereoscopic display unit groups comprises at least one stereoscopic display unit, each of the stereoscopic display units comprises a plurality of pixel groups; in each of the stereoscopic display units, the pixel groups provide a plurality of image beams corresponding to parts of the diverge images, and different stereoscopic display units correspond to the different parts of the diverge images; and
an image guiding plate, disposed on a transmission path of the image beams, wherein the image guiding plate comprises a plurality of optical structures arranged periodically, so as to respectively guide the image beams to a plurality of directions,
wherein the corresponding parts of the diverge images of the different stereoscopic display units comprise a specific one of the diverge images, and
wherein each of the stereoscopic display unit groups comprises a plurality of stereoscopic display units, each of the stereoscopic display units comprises M pixel groups, the specific diverge image N in an $i^{th}$ stereoscopic display unit group is provided by a $j^{th}$ pixel group of each of the stereoscopic display units, i+j=N+1, N, i and j are natural numbers, and j is smaller than or equal to M.

2. The stereoscopic display system according to claim 1, wherein each of the optical structures of the image guiding plate comprises an arc; in each of the stereoscopic display units, the image beam provided by the pixel group corresponding to the specific diverge image passes through a center of the arc corresponding to the stereoscopic display unit of the pixel group.

3. The stereoscopic display system according to claim 2, wherein in the stereoscopic display units, extension lines, which are opposite to traveling directions, of the image beams corresponding to the specific diverge image converge on a side of the display apparatus without the image guiding plate.

4. The stereoscopic display system according to claim 1, wherein in the stereoscopic display units, extension lines, which are opposite to traveling directions, of the image beams provided by the pixel groups corresponding to the same diverge images converge on a side of the display apparatus without the image guiding plate, and form a diverge point.

5. The stereoscopic display system according to claim 4, wherein diverge points corresponding to different diverge images are distributed on a straight line or a curve on the side of the display apparatus without the image guiding plate.

6. The stereoscopic display system according to claim 1, wherein after being emitted from the image guiding plate, the image beams provided by $k^{th}$ pixel groups in the stereoscopic display units are substantially parallel to one another, M and k are natural numbers, and M is greater than or equal to k.

7. The stereoscopic display system according to claim 6, wherein the plurality of optical structures are arranged periodically according to a single cycle, and a width of the stereoscopic display units is substantially equal to the single cycle of the optical structures.

8. The stereoscopic display system according to claim 1, wherein after being emitted from the image guiding plate, the image beams provided by $k^{th}$ pixel groups in the stereoscopic display units diverge in different directions, M and k are natural numbers, and M is greater than or equal to k.

9. The stereoscopic display system according to claim 8, wherein the plurality of optical structures are arranged periodically according to a single cycle, and a width of the stereoscopic display units is greater than the single cycle of the optical structures.

10. The stereoscopic display system according to claim 1, wherein after being emitted from the image guiding plate, the image beams provided by $k^{th}$ pixel groups in the stereoscopic display units converge on an area, M and k are natural numbers, and M is greater than or equal to k.

11. The stereoscopic display system according to claim 10, wherein the plurality of optical structures are arranged periodically according to a single cycle, and a width of the stereoscopic display units is smaller than the single cycle of the optical structures.

12. The stereoscopic display system according to claim 1, wherein the image guiding plate is a lenticular plate, each of the optical structures is a cylindrical lens, each of the cylindrical lenses extends along a first direction, and the cylindrical lenses are arranged along a second direction.

13. An image display method of a stereoscopic display system, comprising:
providing a stereoscopic display system, wherein the stereoscopic display system comprises a display apparatus and an image guiding plate, the display apparatus provides a plurality of diverge images and comprises a plurality of stereoscopic display unit groups, each of the stereoscopic display unit groups comprises at least one stereoscopic display unit, and each of the stereoscopic display units comprises a plurality of pixel groups;
configuring the pixel groups of the stereoscopic display units to provide a plurality of image beams corresponding to parts of the diverge images, wherein different stereoscopic display units corresponding to the different parts of the diverge images; and
using the image guiding plate to respectively guide the image beams to a plurality of directions, wherein the image guiding plate is disposed on a transmission path of the image beams, and the image guiding plate comprises a plurality of optical structures arranged periodically, wherein the corresponding parts of the diverge images of the different stereoscopic display units comprise a specific one of the diverge images, and
wherein each of the stereoscopic display unit groups comprises a plurality of stereoscopic display units, each of the stereoscopic display units comprises M pixel groups, the specific diverge image N in an $i^{th}$ stereoscopic display unit group is provided by a $j^{th}$ pixel group of each of the stereoscopic display units, i+j=N+1, N, i and j are natural numbers, and j is smaller than or equal to M.

14. The image display method of the stereoscopic display system according to claim 13, wherein each of the optical structures of the image guiding plate comprises an arc; in each of the stereoscopic display units, the image beam provided by the pixel group corresponding to the specific diverge image passes through a center of the arc corresponding to the stereoscopic display unit of the pixel group.

15. The image display method of the stereoscopic display system according to claim 14, wherein in the stereoscopic display units, the image beams corresponding to the specific diverge image converge on a side of the display apparatus without the image guiding plate.

16. The image display method of the stereoscopic display system according to claim 13, wherein in the stereoscopic display units, the image beams provided by the pixel groups corresponding to the same diverge images converge on a side of the display apparatus without the image guiding plate, and form a diverge point.

17. The image display method of the stereoscopic display system according to claim 16, wherein diverge points corresponding to different diverge images are distributed on a straight line or a curve on the side of the display apparatus without the image guiding plate.

18. The image display method of the stereoscopic display system according to claim 13, wherein after being emitted from the image guiding plate, the image beams provided by $k^{th}$ pixel groups in the stereoscopic display units are substantially parallel to one another, M and k are natural numbers, and M is greater than or equal to k.

19. The image display method of the stereoscopic display system according to claim 18, wherein the plurality of optical structures are arranged periodically according to a single cycle, and a width of the stereoscopic display units is substantially equal to the single cycle of the optical structures.

20. The image display method of the stereoscopic display system according to claim 13, wherein after being emitted from the image guiding plate, the image beams provided by $k^{th}$ pixel groups in the stereoscopic display units diverge in different directions, M and k are natural numbers, and M is greater than or equal to k.

21. The image display method of the stereoscopic display system according to claim 20, wherein the plurality of optical structures are arranged periodically according to a single cycle, and a width of the stereoscopic display units is greater than the single cycle of the optical structures.

22. The image display method of the stereoscopic display system according to claim 13, wherein after being emitted from the image guiding plate, the image beams provided by $k^{th}$ pixel groups in the stereoscopic display units converge on an area, M and k are natural numbers, and M is greater than or equal to k.

23. The image display method of the stereoscopic display system according to claim 22, wherein the plurality of optical structures are arranged periodically according to a single cycle, and a width of the stereoscopic display units is smaller than the single cycle of the optical structures.

24. The image display method of the stereoscopic display system according to claim 13, wherein the image guiding plate is a lenticular plate, each of the optical structures is a cylindrical lens, each of the cylindrical lenses extends along a first direction, and the cylindrical lenses are arranged along a second direction.

* * * * *